United States Patent [19]
Day et al.

[11] Patent Number: 6,031,062
[45] Date of Patent: Feb. 29, 2000

[54] METHOD FOR PREPARING POLYCARBONATES OF ENHANCED CRYSTALLINITY

[75] Inventors: James Day, Scotia, N.Y.; Gautam Chatterjee, New Delhi, India

[73] Assignee: General Electric Company, Schenectady, N.Y.

[21] Appl. No.: 09/239,481

[22] Filed: Jan. 28, 1999

[51] Int. Cl.[7] .................................................. C08G 64/00
[52] U.S. Cl. .............................................................. 528/196
[58] Field of Search ............................................. 528/196

[56] References Cited

U.S. PATENT DOCUMENTS

| | | | |
|---|---|---|---|
| 4,948,871 | 8/1990 | Fukuoka et al. | 528/481 |
| 5,204,377 | 4/1993 | Fukawa et al. | 521/60 |
| 5,214,073 | 5/1993 | Fukawa et al. | 521/60 |

OTHER PUBLICATIONS

Concurrently filed U.S. Patent Application RD–26315, entitled "Method for Preparing Copolycarbonates of Enhanced Crystallinity", by Marc B. Wisnudel et al.

*Primary Examiner*—Terressa M. Boykin
*Attorney, Agent, or Firm*—Robert T. Barker; Noreen C. Johnson

[57] ABSTRACT

Crystallinity of amorphous precursor polycarbonates is enhanced by contact with at least on diaryl carbonate such as diphenyl carbonate, followed by pelletization and heating to a temperature above the melting point of the diaryl carbonate and below the glass transition temperature of the amorphous precursor polycarbonate. The crystallinity enhancement operation may be conducted in the presence of dihydroxyorganic monomers and may be followed by a solid state polymerization operation.

25 Claims, No Drawings

METHOD FOR PREPARING POLYCARBONATES OF ENHANCED CRYSTALLINITY

BACKGROUND OF THE INVENTION

This invention relates to the preparation of polycarbonates, and more particularly to their preparation by a method requiring enhancement of crystallinity.

Solid state polymerization (hereinafter sometimes "SSP") of polycarbonates is disclosed, for example, in U.S. Pat. Nos. 4,948,871, 5,204,377 and 5,214,073, the disclosures of which are incorporated by reference herein. It involves a first step of forming a precursor polycarbonate, typically a prepolymer formed by melt polymerization (i.e., transesterification) of a dihydroxyaromatic compound such as bisphenol A with a diaryl carbonate such as diphenyl carbonate; a second step of enhancing the crystallinity of the prepolymer; and a third step of building the molecular weight of the crystallized prepolymer by heating to a temperature between its glass transition temperature and its melting temperature. Use of this polymerization method is of increasing interest by reason of its effectiveness and environmental benefits.

The second or crystallinity enhancement step of this method is, at least in part, required to suppress fusion of the particles of precursor polycarbonate during the SSP step. An essential chemical feature of the SSP step is removal of hydroxyaromatic compound, usually phenol, from the polymer end groups, permitting molecular weight increase. Such removal must occur uniformly throughout the mass of precursor polycarbonate, which cannot happen if the particles fuse into larger agglomerates. By crystallinity, throughout the mass or at least on the surfaces of the particles thereof, fusion is inhibited.

Crystallinity enhancement is performed, according to the prior art, by solvent treatment or heat treatment. As described, the solvent treatment method may in fact employ a good or poor solvent for the prepolymer, with contact involving either the liquid or vapor form thereof. Illustrative "solvents" include aliphatic aromatic hydrocarbons, alcohols, ethers, esters, ketones, halogenated aliphatic and aromatic hydrocarbons, and diaryl carbonates.

The use of "solvents" for crystallinity enhancement requires a separate step of contact of the precursor polycarbonate with the "solvent". Only after that separate step is completed can SSP be undertaken. For economy of operation, it would be preferred to perform crystallinity enhancement and SSP in a single, continuous sequence not requiring steps such as removal of an extraneous liquid. Enhancement by heat treatment, i.e., thermally, would be preferable for this purpose.

As disclosed in the aforementioned U.S. Pat. No. 4,948, 871, however, thermal crystallinity enhancement requires a temperature between the glass transition temperature (Tg) and the melting temperature of the precursor polycarbonate. Any heating above the Tg has the effect of causing fusion of the precursor particles into larger agglomerates, which is counterproductive for phenol removal. Thus, the very operation that makes SSP possible also inhibits it.

It would be desirable, therefore, to develop a thermal crystallinity enhancement method which can, when desired, be combined with pelletization without forming large agglomerates from the pellets or other particles of precursor polycarbonate. It would be particularly desirable to develop a method which can be integrated with SSP.

SUMMARY OF THE INVENTION

The present invention affords a crystallinity enhancement method which can be employed in combination with a pelletization operation on precursor polycarbonate, without causing the pellets to fuse into larger particles which can inhibit phenol removal. It further affords a method which is easily combined with SSP into an integrated series of steps.

In one of its aspects, the invention is a method for preparing a pelletized precursor polycarbonate of enhanced crystallinity which comprises intimately contacting amorphous precursor polycarbonate with at least one diaryl carbonate to form a pelletizable mixture and pelletizing said mixture, said diaryl carbonate being present in an amount effective to permeate the pellets thus formed, and heating the permeated pellets to a contact temperature above the melting point of said diaryl carbonate and below the glass transition temperature of said amorphous precursor polycarbonate.

Another aspect of the invention is a method for preparing a polycarbonate which comprises the above-described operations followed by polymerization of said precursor polycarbonate of enhanced crystallinity by solid state polymerization.

DETAILED DESCRIPTION; PREFERRED EMBODIMENTS

The essential starting material in the method of this invention is an amorphous precursor polycarbonate. As used herein, "polycarbonate" includes copolycarbonates and polyestercarbonates.

Precursor polycarbonates useful in the method of this invention typically comprise structural units of the formula:

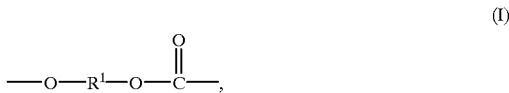

wherein at least about 60% of the total number of $R^1$ groups are aromatic organic radicals and the balance thereof are aliphatic, alicyclic, or aromatic radicals. Preferably, each $R^1$ is an aromatic organic radical and more preferably a radical of the formula:

wherein each $A^1$ and $A^2$ is a monocyclic divalent aryl radical and Y is a bridging radical in which one or two carbon atoms separate $A^1$ and $A^2$. Such radicals are derived from dihydroxyaromatic compounds of the formulas HO—R—OH and HO—$A^1$—Y—$A^2$—OH respectively. For example, $A^1$ and $A^2$ generally represent unsubstituted phenylene, especially p-phenylene which is preferred, or substituted derivatives thereof. The bridging radical Y is most often a hydrocarbon group and particularly a saturated group such as methylene, cyclohexylidene, or isopropylidene which is preferred. Thus, the most preferred polycarbonates are those derived entirely or in part from 2,2-bis(4-hydroxyphenyl) propane, also known as "bisphenol A".

The amorphous precursor polycarbonate is often a polycarbonate oligomer of the type produced by the first step of a melt polycarbonate process or by bischloroformate oligomer preparation followed by hydrolysis and/or endcapping and isolation. Such oligomers most often have a weight average molecular weight (Mw) in the range of about 2,000–10,000 as determined by gel permeation chromatography which may be relative to polycarbonate or polystyrene, and an intrinsic viscosity in the range of about 0.06–0.30 dl/g, all intrinsic viscosity values herein being as determined in chloroform at 25° C.

The precursor polycarbonate may also be a relatively high molecular weight polycarbonate, generally having a weight average molecular weight (Mw) in the range of about 10,000–35,000, for which it is desired to increase the molecular weight still further; e.g., up to a value in the range of about 50,000–80,000. For example, polycarbonates which are off-specification for a particular application may be crystallized by the method of this invention prior to increasing its molecular weight so that they may be used in other applications.

The precursor polycarbonate may be a branched homo- or copolycarbonate, formed by the reaction of a linear polycarbonate or its precursor(s) with a branching agent such as 1,1,1-tris(4-hydroxyphenyl)ethane. Branched copolycarbonates include oligomers and high molecular weight copolycarbonates containing units adapted to maximize solvent resistance. Hydroquinone and methylhydroquinone carbonate units are particularly suitable for this purpose, as disclosed in U.S. Pat. No. 4,920,200. Such units will typically comprise about 25–50% of total carbonate units in the polymer. Conversion to the branched homo- or copolycarbonate may precede or occur simultaneously with the conversion of the precursor polycarbonate to an enhanced crystallinity polymer.

The precursor polycarbonate may also be a recycled polycarbonate. Its method of original preparation is immaterial; i.e., recycled polycarbonate originally prepared by interfacial polymerization, by melt polymerization or from bischloroformates may be employed.

Such recycled material typically has a molecular weight which has been degraded from that of the originally polymerized material as shown by an intrinsic viscosity in the range of about 0.25–1.0 dl/g. It may be obtained from scrap polycarbonate by dissolution in a chlorinated organic solvent such as chloroform, methylene chloride or 1,2-dichloroethane followed by filtration of the insoluble material or other art-recognized procedures for separation of non-polycarbonate constituents. Other types of polycarbonate, such as interfacially prepared polycarbonate and polycarbonate extruder wastes, may also be employed as precursors.

Prior to treatment according to the invention, it is within the scope of the invention, particularly when the precursor polycarbonate is a recycled material, to dissolve it in a chlorinated hydrocarbon as solvent. Illustrative chlorinated hydrocarbons are methylene chloride, chloroform, 1,2-dichloroethane, chlorobenzene and o-dichlorobenzene. The chloroaliphatic hydrocarbons are preferred, with methylene chloride and 1,2-dichloroethane being most preferred.

Dissolution of the precursor polycarbonate in the solvent may take place at any temperature. Typical temperatures are from about 0° C. to the boiling point of the solvent, with about 20–100° C. generally being preferred. So long as an amount of solvent effective to dissolve the polycarbonate is employed, its proportion is not critical.

Such dissolution generally leaves behind various insoluble materials. The invention further contemplates removal of said insoluble materials from the polycarbonate solution. This may be achieved by such conventional operations as decantation, filtration and centrifugation.

The recycled polycarbonate is frequently associated with colored impurities, which may appear in the polycarbonate itself or in the solution thereof in the chlorinated solvent. Various embodiments of the invention, therefore, include a step of removing color from the amorphous polycarbonate solution following other removal steps. One method for color discharge is treatment while in solution with a mineral acid, preferably hydrochloric acid, said acid typically being in solution in an alkanol such as methanol. Another is contact of said solution with a solid that absorbs color bodies, such as activated charcoal or a crosslinked resin, which may be neutral or may be an ion exchange resin. Another is washing with a solution of sodium gluconate. Still another is washing of the resin, after precipitation as described hereinafter, with non-solvent in an amount sufficient to dissolve color bodies.

The solution of amorphous precursor polycarbonate is, for the most part, freed of any solvent prior to crystallinity enhancement. It is usually advantageous to precipitate the precursor polycarbonate therefrom by such art-recognized methods as anti-solvent precipitation or steam precipitation.

According to the invention, the amorphous precursor polycarbonate is contacted with at least one diaryl carbonate, preferably diphenyl carbonate, and the resulting mixture is pelletized. Said mixture may further contain other materials, especially dihydroxyorganic monomers to be incorporated in the polycarbonate during SSP. Illustrative of such monomers are processability improving materials, usually polyoxyethylene glycols such as polyethylene glycol (hereinafter "PEG").

Other monomers which may be incorporated are those which reduce birefringence in the product polycarbonate. These particularly include spiro(bis)indane bisphenols of the formula

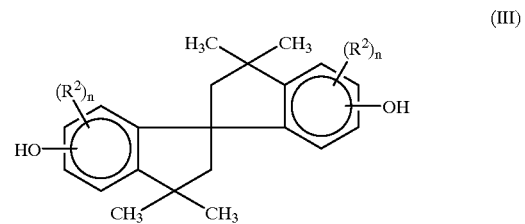

and phenylindane bisphenols of the formula

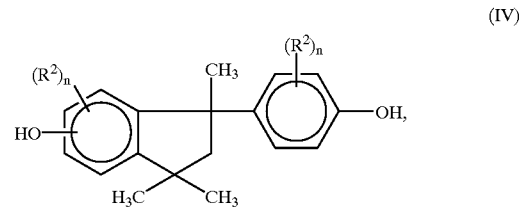

wherein $R^2$ is hydrogen or $C_{1-4}$ primary or secondary alkyl and n is 0–2. The preferred monomers of formulas III and IV respectively are 6,6'-hydroxy-3,3,3',3'-tetramethyl-1,1'-spiro (bis)indane, hereinafter designated "SBI", and 1,1,3-trimethyl-3-(4-hydroxyphenyl)-5-hydroxyindane.

The proportion of diaryl carbonate employed is an amount sufficient to swell the pellets or particles of amorphous precursor polycarbonate. In general, about 0.5–3.0 mole percent of diaryl carbonate, based on structural units in the precursor polycarbonate combined with any added monomers, is effective. At such levels, the diary carbonate permeates the pellets and acts as a plasticizer therefor, causing crystallization throughout the pellet. Other monomers, when employed, are present in amounts effective to produce the desired level in the final polycarbonate of structural units derived from such monomers.

Contact with the diaryl carbonate and, optionally, other monomer(s) is at an elevated temperature above the melting point of the diaryl carbonate, which is 83° C. for diphenyl carbonate, and below the Tg of the amorphous precursor polycarbonate, which is often in the neighborhood of 120° C. for bisphenol A polycarbonates. Thus, typical contact temperatures are in the range of 85–115° C.

Following crystallinity enhancement, the precursor polycarbonate may be, and preferably is, subjected to art-recognized solid state polymerization conditions. The SSP reaction may be effected at a temperature above the glass transition temperature of the precursor polycarbonate and below its melting temperature. In general, temperatures in the range of about 150–270° and especially about 180–250° C. are suitable.

As disclosed in the aforementioned U.S. Pat. Nos. 4,948,871, 5,204,377 and 5,717,056, crystallinity enhancement and SSP may be conducted in the presence of at least one catalyst. Suitable catalysts include those known in the art to be effective in such polycarbonate reactions as melt polymerization, redistribution, equilibration and solid state polymerization. However, catalysts are not required for the present invention and their presence is frequently not preferred.

Solid state polymerization may be conducted in a mixer capable of producing intimate gas-solid contact, such as a fixed bed, fluidized bed or paddle mixer, in contact with an inert gas such as nitrogen or argon which serves as the fluidizing gas if a fluidized bed is employed. Said inert gas may serve one or both of the purposes of fluidizing the mixture and volatilizing and removing by-products, including water, hydroxyaromatic compound and any volatile carbonate formed as a by-product. Programmed heating may be advantageously employed, and in particular a temperature ramping regime which includes both crystallinity enhancement and SSP temperatures may be utilized. As an alternative to conditions of intimate gas-solid contact, the polymerization may be conducted at reduced pressure, typically less than about 100 torr, preferably with efficient mixing.

It is possible for the SSP reaction to result in the incorporation into the polymer of the diaryl carbonate employed for crystallinity enhancement. For the purposes of the invention, the occurrence or non-occurrence of such incorporation is not significant.

The method of the invention is illustrated by the following examples. Crystallinity percentages were determined by differential scanning calorimetry. Mw values were determined by gel permeation chromatography relative to polystyrene.

EXAMPLE 1

A commercially available bisphenol A polycarbonate having a Mw of about 52,000 was blended at 100° C. in a Henschel mixer with SBI and a PEG having a molecular weight of about 400 to form a powder having proportions of bisphenol A, SBI and PEG of 79:18:3, with the PEG proportions being calculated on the basis of the molecular weight of 400. Diphenyl carbonate was added in the amount of 2 mole percent based on the total of bisphenol A, SBI and PEG units and blending was repeated. The powder was extruded on a twin screw extruder at temperatures in the range of 260–310° C. The extruded polycarbonate oligomer had a crystallinity of 23% and a melt onset temperature of 141° C.

EXAMPLE 2

An amorphous bisphenol A polycarbonate oligomer having a Mw of about 8,000, prepared by a transesterification reaction of bisphenol A with diphenyl carbonate, was coextruded with 1 mole percent, based on structural units in the polycarbonate, of diphenyl carbonate. The extrudate was blended at 105° C. in a Henschel mixer for one hour to produce an oligomer of enhanced crystallinity. The temperature of the mixer was then increased to 180° C. for 2 hours, 220° C. for 10 hours and 230° C. for 7 hrs to effect solid state polymerization. The product was the desired polycarbonate having a Mw of 24,800, a Tg of 138° C. and a melt onset temperature of 252° C.

What is claimed is:

1. A method for preparing a pelletized precursor polycarbonate of enhanced crystallinity which comprises intimately contacting amorphous precursor polycarbonate with at least one diaryl carbonate to form a pelletizable mixture and pelletizing said mixture, said diaryl carbonate being present in an amount effective to permeate the pellets thus formed, and heating the permeated pellets to a contact temperature above the melting point of said diaryl carbonate and below the glass transition temperature of said amorphous precursor polycarbonate.

2. A method according to claim 1 which is conducted in the absence of catalyst.

3. A method according to claim 1 wherein the amorphous precursor polycarbonate is a bisphenol A polycarbonate.

4. A method according to claim 1 wherein the amorphous precursor polycarbonate is a polycarbonate oligomer.

5. A method according to claim 1 wherein the amorphous precursor polycarbonate is a high molecular weight polycarbonate.

6. A method according to claim 1 wherein the amorphous precursor polycarbonate is a branched homo- or copolycarbonate.

7. A method according to claim 1 wherein the amorphous precursor polycarbonate is a recycled polycarbonate.

8. A method according to claim 1 wherein the pelletizable mixture further contains at least one dihydroxyorganic monomer.

9. A method according to claim 8 wherein the dihydroxyorganic monomer is at least one of polyoxyethylene glycols, spiro(bis)indane bisphenols of the formula

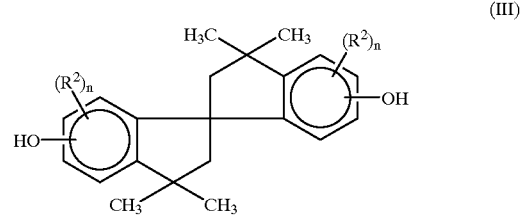

and phenylindane bisphenols of the formula

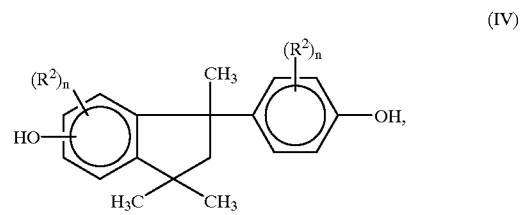

wherein $R^2$ is hydrogen or $C_{1-4}$ primary or secondary alkyl and n is 0–2.

10. A method according to claim 9 wherein the dihydroxyorganic monomer is at least one of polyethylene glycol and 6,6'-hydroxy-3,3,3',3'-tetramethyl-1,1'-spiro(bis)indane.

11. A method according to claim 1 wherein the diaryl carbonate is diphenyl carbonate.

12. A method according to claim 11 wherein the contact temperature is in the range of about 85–115° C.

13. A method according to claim 11 wherein the proportion of diphenyl carbonate is in the range of about 0.5–3.0 mole percent, based on structural units in the precursor polycarbonate combined with any added monomers.

14. A method for preparing a polycarbonate which comprises:

intimately contacting amorphous precursor polycarbonate pellets with at least one diaryl carbonate in an amount effective to permeate said pellets, heating the permeated pellets to a contact temperature above the melting point of said diaryl carbonate and below the glass transition temperature of said amorphous precursor polycarbonate, thus producing a precursor polycarbonate of enhanced crystallinity, and polymerizing said precursor polycarbonate of enhanced crystallinity by solid state polymerization.

15. A method according to claim 14 which is conducted in the absence of catalyst.

16. A method according to claim 14 wherein the amorphous precursor polycarbonate is a bisphenol A polycarbonate.

17. A method according to claim 14 wherein the pelletizable mixture further contains at least one dihydroxyorganic monomer.

18. A method according to claim 17 wherein the dihydroxyorganic monomer is at least one of polyoxyethylene glycols, spiro(bis)indane bisphenols of the formula

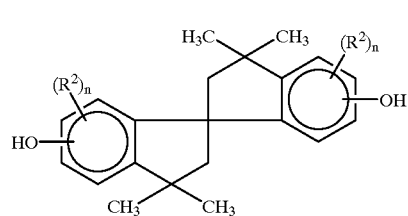

(III)

and phenylindane bisphenols of the formula

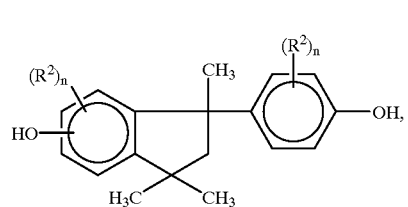

(IV)

wherein $R^2$ is hydrogen or $C_{1-4}$ primary or secondary alkyl and n is 0–2.

19. A method according to claim 14 wherein the diaryl carbonate is diphenyl carbonate.

20. A method according to claim 19 wherein the contact temperature is in the range of about 85–115° C.

21. A pelletized precursor polycarbonate prepared by the method of claim 1.

22. A pelletized precursor polycarbonate prepared by the method of claim 9.

23. A polycarbonate prepared by the method of claim 14.

24. A polycarbonate prepared by the method of 18.

25. An article comprising the polycarbonate of claim 23.

* * * * *